US012113296B2

(12) United States Patent
Zhu et al.

(10) Patent No.: US 12,113,296 B2
(45) Date of Patent: Oct. 8, 2024

(54) ADJUSTABLE UNEQUAL POWER COMBINER AND SWITCH

(71) Applicant: Tubis Technology, Inc., San Diego, CA (US)

(72) Inventors: Siqi Zhu, Pasadena, CA (US); James Wang, Pasadena, CA (US)

(73) Assignee: Tubis Technology, Inc., San Diego, CA (US)

( * ) Notice: Subject to any disclaimer, the term of this patent is extended or adjusted under 35 U.S.C. 154(b) by 0 days.

(21) Appl. No.: 18/107,643

(22) Filed: Feb. 9, 2023

(65) Prior Publication Data

US 2023/0246331 A1 Aug. 3, 2023

Related U.S. Application Data

(62) Division of application No. 16/458,547, filed on Jul. 1, 2019, now Pat. No. 11,581,641.

(60) Provisional application No. 62/692,935, filed on Jul. 2, 2018.

(51) Int. Cl.

| | |
|---|---|
| ***H01Q 21/00*** | (2006.01) |
| ***H01P 3/08*** | (2006.01) |
| ***H01P 5/12*** | (2006.01) |
| ***H01P 5/16*** | (2006.01) |
| ***H01Q 3/34*** | (2006.01) |
| ***H01Q 21/06*** | (2006.01) |

(52) U.S. Cl.

CPC ................. *H01Q 3/34* (2013.01); *H01P 3/08* (2013.01); *H01P 5/16* (2013.01); *H01Q 21/062* (2013.01); *H01Q 21/065* (2013.01)

(58) Field of Classification Search

CPC ...... H01P 3/08; H01P 5/04; H01P 5/12; H01P 5/16; H01Q 1/22; H01Q 1/2283; H01Q 21/00; H01Q 21/06; H01Q 21/062; H01Q 21/065; H01Q 21/22; H01Q 3/24; H01Q 3/26; H01Q 3/34; H01Q 5/42

See application file for complete search history.

(56) References Cited

U.S. PATENT DOCUMENTS

| | | | | |
|---|---|---|---|---|
| 4,129,839 | A | 12/1978 | Galani et al. | |
| 5,017,927 | A * | 5/1991 | Agrawal ................ | H01Q 25/02 342/371 |
| 5,079,527 | A | 1/1992 | Goldfarb | |
| 5,166,690 | A * | 11/1992 | Carlson .............. | H01Q 21/0025 342/373 |
| 5,455,546 | A | 10/1995 | Frederick et al. | |
| 6,489,859 | B1 | 12/2002 | Tahara et al. | |
| 6,504,505 | B1 * | 1/2003 | Yung ........................ | H01Q 3/26 342/374 |

(Continued)

*Primary Examiner* — Tho G Phan

(57) ABSTRACT

A single stage unequal power combiner is proposed. Instead of conventional combiner plus impedance transformer of 2-stage unequal combiner, the single stage combiner gets rid of the input impedance transformer. The single stage combiner supports adjustable transmission line impedance and reasonable mismatch loss, assuming that the power ratio of the input signals is within a certain range. The single stage combiner also has an adjustable isolation resistor for different power ratios. A structure of switchable branch characteristic impedance, switchable isolation resistor for the unequal combiner is proposed as the preferred embodiment. In one advantageous aspect, broader coverage angle in a single array module can be realized via an antenna diversity switch.

2 Claims, 6 Drawing Sheets

(56) References Cited

U.S. PATENT DOCUMENTS

| | | | | |
|---|---|---|---|---|
| 6,621,374 | B2 | 9/2003 | Higgins et al. | |
| 6,646,599 | B1 * | 11/2003 | Apa ..................... | H01Q 21/245 342/368 |
| 6,738,017 | B2 * | 5/2004 | Jacomb-Hood .... | H01Q 21/0025 342/368 |
| 8,482,364 | B2 | 7/2013 | Floyd et al. | |
| 10,256,522 | B2 * | 4/2019 | Zhai ..................... | H01Q 21/065 |
| 11,063,355 | B2 | 7/2021 | Wu et al. | |

* cited by examiner

310

320

| | | K | Z02 | Z03 | Z04 | Z05 | R |
|---|---|---|---|---|---|---|---|
| P4/P5(dB)= | 30 | 0.03 | 50.00 | 10000.00 | | | 1582.72 |
| P4/P5(dB)= | 6 | 0.50 | 39.59 | 157.63 | 35.40 | 70.63 | 124.82 |
| P4/P5(dB)= | 5 | 0.56 | 43.02 | 136.03 | 37.49 | 66.68 | 117.03 |
| P4/P5(dB)= | 4 | 0.63 | 46.96 | 117.96 | 39.72 | 62.95 | 110.79 |
| P4/P5(dB)= | 3 | 0.71 | 51.55 | 102.85 | 42.07 | 59.43 | 106.02 |
| P4/P5(dB)= | 2 | 0.79 | 56.91 | 90.20 | 44.56 | 56.10 | 102.66 |
| P4/P5(dB)= | 1 | 0.89 | 63.23 | 79.60 | 47.20 | 52.96 | 100.66 |
| P4/P5(dB)= | 0 | 1.00 | 70.71 | 70.71 | 50.00 | 50.00 | 100.00 |
| P4/P5(dB)= | -1 | 1.12 | 79.60 | 63.23 | 52.96 | 47.20 | 100.66 |
| P4/P5(dB)= | -2 | 1.26 | 90.20 | 56.91 | 56.10 | 44.56 | 102.66 |
| P4/P5(dB)= | -3 | 1.41 | 102.85 | 51.55 | 59.43 | 42.07 | 106.02 |
| P4/P5(dB)= | -4 | 1.58 | 117.96 | 46.96 | 62.95 | 39.72 | 110.79 |
| P4/P5(dB)= | -5 | 1.78 | 136.03 | 43.02 | 66.68 | 37.49 | 117.03 |
| P4/P5(dB)= | -6 | 2.00 | 157.63 | 39.59 | 70.63 | 35.40 | 124.82 |
| P4/P5(dB)= | -30 | 31.62 | 1000.00 | 50.00 | | | 1582.72 |

410

420

| | | K | Z02 | Z03 | R | Loss NO $Z_{04}$ | Loss NO $Z_{05}$ |
|---|---|---|---|---|---|---|---|
| P4/P5(dB)= | 30 | 0.03 | 50.00 | 10000.00 | Open | 0.00 | -40.00 |
| P4/P5(dB)= | 6 | 0.50 | 39.59 | 157.63 | 125 | -15.34 | -15.34 |
| P4/P5(dB)= | 5 | 0.56 | 43.02 | 136.03 | 117 | -16.90 | -16.90 |
| P4/P5(dB)= | 4 | 0.63 | 46.96 | 117.96 | 111 | -18.81 | -18.81 |
| P4/P5(dB)= | 3 | 0.71 | 51.55 | 102.85 | 106 | -21.30 | -21.30 |
| P4/P5(dB)= | 2 | 0.79 | 56.91 | 90.20 | 100 | -24.81 | -24.81 |
| P4/P5(dB)= | 1 | 0.89 | 63.23 | 79.60 | 100 | -30.82 | -30.82 |
| P4/P5(dB)= | 0 | 1.00 | 70.71 | 70.71 | 100 | -40.00 | -40.00 |
| P4/P5(dB)= | -1 | 1.12 | 79.60 | 63.23 | 100 | -30.82 | -30.82 |
| P4/P5(dB)= | -2 | 1.26 | 90.20 | 56.91 | 100 | -24.81 | -24.81 |
| P4/P5(dB)= | -3 | 1.41 | 102.85 | 51.55 | 106 | -21.30 | -21.30 |
| P4/P5(dB)= | -4 | 1.58 | 117.96 | 46.96 | 111 | -18.81 | -18.81 |
| P4/P5(dB)= | -5 | 1.78 | 136.03 | 43.02 | 117 | -16.90 | -16.90 |
| P4/P5(dB)= | -6 | 2.00 | 157.63 | 39.59 | 125 | -15.34 | -15.34 |
| P4/P5(dB)= | -30 | 31.62 | 1000.00 | 50.00 | Open | -40.00 | 0.00 |

420

420

Variable TL characteristic impedance

50ohm: A is grounded
56.91ohm: F and B are grounded
63.23ohm: E and B are grounded
70.71ohm: B is grounded
79.6ohm: C is grounded
90.2ohm: D is grounded

ADJUSTABLE UNEQUAL POWER COMBINER AND SWITCH

CROSS REFERENCE TO RELATED APPLICATIONS

This application is a divisional of and claims priority to U.S. application Ser. No. 16/458,547, filed Jul. 1, 2019 and entitled "Adjustable Unequal Power Combiner and Switch", which claims priority under 35 U.S.C. § 119 from U.S. Provisional Application No. 62/692,935, entitled "Adjustable Unequal Power Combiner and Switch," filed on Jul. 2, 2018, which are all assigned to the assignee hereof and hereby expressly incorporated by reference in their entirety.

TECHNICAL FIELD

The disclosed embodiments relate generally to phased array antenna, and, more particularly, to unequal power combiner and switch used for phased-array antenna in wireless communications systems.

BACKGROUND

The bandwidth shortage increasingly experienced by mobile carriers has motivated the exploration of the underutilized Millimeter Wave (mmWave) frequency spectrum around 20G to 300G Hz for the next generation broadband cellular communication networks. The available spectrum of the mmWave band is hundreds of times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions.

In antenna theory, a phased antenna array usually means an array of antennas that creates a beam of radio waves can be electronically steered to point in different directions, without moving the antennas. In the phased antenna array, the radio frequency current from the transmitter is fed to the individual antennas with the correct phase relationship so that the radio waves from the separate antennas add together to increase the radiation in a desired direction, while cancelling to suppress radiation in undesired directions. In the phased antenna array, the power from the transmitter is fed to the antennas through phase shifters, controlled by a processor, which can alter the phase electronically, thus steering the beam of radio waves to a different direction.

A receive phased-array antenna includes a combiner network, which is formed by multiple combiners. Similarly, a transmit phased-array antenna includes a divider network, which is formed by multiple dividers. A passive divider network is structurally the same as a combiner network. Under phased-array antenna operation, the array pattern=Element Gain*Array Factor (good approximation for scanning angel of interest). It is desirable to have a smooth element pattern that covers the array field of view (FoV). Phased-array antenna elements are generally placed in regular grid points (rectangular grid or hexagonal placement). For microwave, mmWave, or higher frequencies, it is important to place active circuits (e.g., low noise amplifiers (LNAs), power amplifiers (PAs), combiners, dividers, or phase shifters) very close to the antenna elements to reduce trace loss and to reduce performance degradation.

A typical phased-array antenna likes to see antenna element pattern having exactly the same antenna pattern. However, due to close proximity of the antenna elements, there are coupling between antenna elements. An embedded antenna element pattern (EEP) for an antenna element within a phased array is a composite antenna pattern of the isolated pattern of the antenna element itself (with no adjacent elements) plus the coupling due to the surrounding elements. Typically, antenna elements in the center of an array has different EEP from the antenna elements at the perimeter of an array. Therefore, it is a common practice to add extra padding cells (i.e., dummy antenna elements with termination) around the perimeter of the array, such that the antenna array has same or similar EEP for all its active elements.

For a small-sized phased-array antenna, due to the size restriction, it is difficult to add padding cells. If a small antenna array has no padding cells, then the antenna array has different EEPs for different elements. The receive (or transmit) signal power distributed non-uniformly among different antenna elements due to different EEPs. However, the overall receive (or transmit) signal power of the entire array remains the same even with non-uniform distribution. Most of the passive combiner provides combining only for even mode, that is, the input signals are equal power and equal phase. If unequal signals are combined with equal Wilkinson combiner or equal Lange coupler, this results in degraded array performance, i.e., the signal-to-noise ratio (SNR) after combining is not optimized.

Another aspect of the array antenna design is the antenna sidelobe control. If multiple array antennas are placed in proximity to support multiple communication links such as in a base station. Multiple array antennas point to different user equipment directions to support multiple simultaneous communication links, the antenna sidelobe of one array antenna interferes with the mainlobe of another array antenna. To suppress the antenna sidelobe, amplitude tapering is applied where the signals of different antenna elements are weighted differently. To achieve such amplitude tapering, the variable amplifier and unequal combining are required to adjust the signal levels for different antennas.

A solution of adjustable unequal power combiner implementation with optimized SNR from antenna array operation and reduced size is sought.

SUMMARY

A single stage unequal power combiner is proposed. Instead of the combiner plus the impedance transformer structure of the conventional 2-stage unequal combiner, the single stage unequal combiner removes the input impedance transformer stage. The single stage unequal combiner supports adjustable transmission line impedance and achieves reasonable mismatch loss, assuming that the power ratio of the input signals is within a certain range. The single stage combiner also has an adjustable isolation resistor for different power ratios. A structure of switchable branch characteristic impedance, switchable isolation resistor for the unequal combiner is proposed as the preferred embodiment. In one advantageous aspect, broader coverage angle in a single array module can be realized via an antenna diversity switch.

In one embodiment, the combiner receives a first input signal through a first transmission line that is coupled to a first input terminal and an output terminal. The first transmission line has a first impedance. The combiner receives a second input signal through a second transmission line that is coupled to a second input terminal and the output terminal. The second transmission line has a second impedance. The combiner combines the first input signal and the second input signal to output an output signal. An isolation resistor is coupled to the first and the second input terminals. The first and the second impedances are adjustable based on an input signal power ratio between the first and the second input signals. The combiner has mismatch loss less than a predefined mismatch loss threshold when the input signal power ratio is within a limited range.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
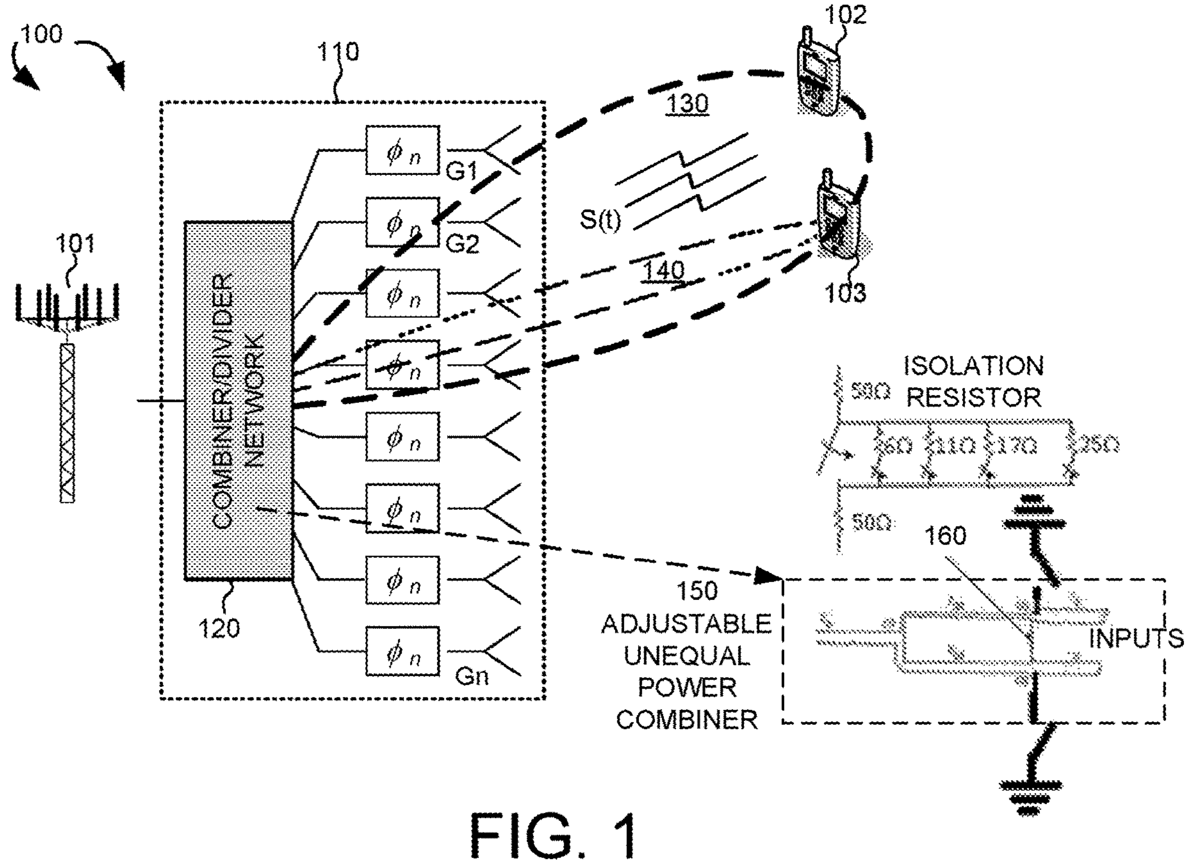
FIG. 1 illustrates a wireless device having a phased-array antenna for transmitting or receiving a directional beam in a beamforming cellular communication network in accordance with a novel aspect.

FIG. 1 illustrates a wireless device having a phased-array antenna for transmitting or receiving a directional beam in a beamforming cellular communication network 100 in accordance with a novel aspect. Beamforming cellular mobile communication network 100 comprises a base station BS 101 and a first user equipment UE 102 and a second user equipment UE 103. The cellular network uses directional communications with narrow beams and can support multi-gigabit data rate. One example of such cellular network is a Millimeter Wave (mmWave) network utilizing the mmWave frequency spectrum. In such mmWave network, directional communications are achieved via beamforming, wherein a phased antenna array having multiple antenna elements are applied with multiple sets of beamforming weights (phase shift values) to form multiple beam patterns. In the example of FIG. 1, phased antenna array 110 of BS 101 is directionally configured with a set of coarse TX/RX control beams (130) and a set of dedicated TX/RX data beams (140) to serve mobile stations including UE 102 and UE 103. The set of wider-coverage control beams provides low rate control signaling to facilitate high rate data communication on dedicated data beams. Similarly, UE 102 and UE 103 may also apply beamforming to from multiple beam patterns to transmit and receive radio signals.

In antenna theory, a phased antenna array usually means an array of antennas that creates a beam of radio waves can be electronically steered to point in different directions, without moving the antennas. In the phased antenna array, the radio frequency current from the transmitter is fed to the individual antennas with the correct phase relationship so that the radio waves from the separate antennas add together to increase the radiation in a desired direction, while cancelling to suppress radiation in undesired directions. In the phased antenna array, the power from the transmitter is fed to the antennas through phase shifters, controlled by a processor, which can alter the phase electronically, thus steering the beam of radio waves to a different direction.

A typical phased-array antenna likes to see antenna element pattern having exactly the same antenna pattern. However, due to close proximity of the antenna elements, there are coupling between antenna elements. An embedded antenna element pattern (EEP) for an antenna element within a phased array is a composite antenna pattern of the isolated pattern of the antenna element itself (with no adjacent elements) plus the coupling due to the surrounding elements. Typically, antenna elements in the center of an array has different EEP from the antenna elements at the perimeter of an array. Therefore, it is a common practice to add extra padding cells (i.e., dummy antenna elements with termination) around the perimeter of the array, such that the antenna array has same or similar EEP for all its active elements.

For a small-sized phased-array antenna, due to the size restriction, it is difficult to add padding cells. If a small antenna array has no padding cells, then the antenna array has different EEPs for different elements. The receive (or transmit) signal power distributed non-uniformly among different antenna elements due to different EEPs. However, the overall receive (or transmit) signal power of the entire array remains the same even with non-uniform distribution. Most of the passive combiner provides combining only for even mode, that is, the input signals are equal power and equal phase. If unequal signals are combined with equal Wilkinson combiner or equal Lange coupler, this results in degraded antenna array performance, i.e., the signal-to-noise ratio after combining is not optimized.

The design of a combiner parameters needs to consider impedance matching, port isolation, losses, and required implementation cost (such as die area or power consumption within a chip). When such combiner is used in phased-array antenna, then the design needs to consider RF chain turning on/off (impedance matching issues) and RF chain has different gains (adjustable unequal combining). If the two combined signals are not equal in magnitude, an equal combiner can result in loss in the signal-to-noise ratio of the combined signal. For unequal combiner, to achieve impedance match, two-stage of combiners (2× quarter wavelength transmission line, with an additional input impedance transformer) makes the combiner too large to implement in silicon. Therefore, it is desirable to achieve adjustable unequal combining with reasonable mismatch loss and reduced die size.

In according with one novel aspect, a single stage unequal combiner with adjustable isolation resistor is proposed and implemented. Phased antenna array 110 receives input signals S(t) via different antenna elements and combines the input signals via combiner network 120. Signals S(t) after low noise amplifies (LNAs) are unequal power, noise from LNAs are uncorrelated but equal power. For different antenna beam directions, the antenna element gains (Gn(e)) are different. For combiner network 120, it comprises a plurality of combiners, each combiner is an adjustable unequal power combiner (150) to achieve reasonable impedance matching for limited range of unequal power ratio combining of the input signals. The single stage combiner 150 simplifies the traditional 2-stage combiner (2× quarter wavelength transmission line) design to reduce the size of the silicon. Instead of conventional combiner plus impedance transformer of the 2-stage unequal combiner, the single stage unequal combiner removes the input impedance transformer. The single stage combiner supports adjustable transmission line impedance and reasonable mismatch loss, assuming the that power ratio of the input signals is within a certain range. The single stage combiner also has an adjustable isolation resistor 160 for different power ratios. A structure of switchable branch characteristic impedance, switchable isolation resistor for the unequal combiner is proposed as the preferred embodiment. In one advantageous aspect, broader coverage angle in a single array module can be realized via an antenna diversity switch.

Figure 2:
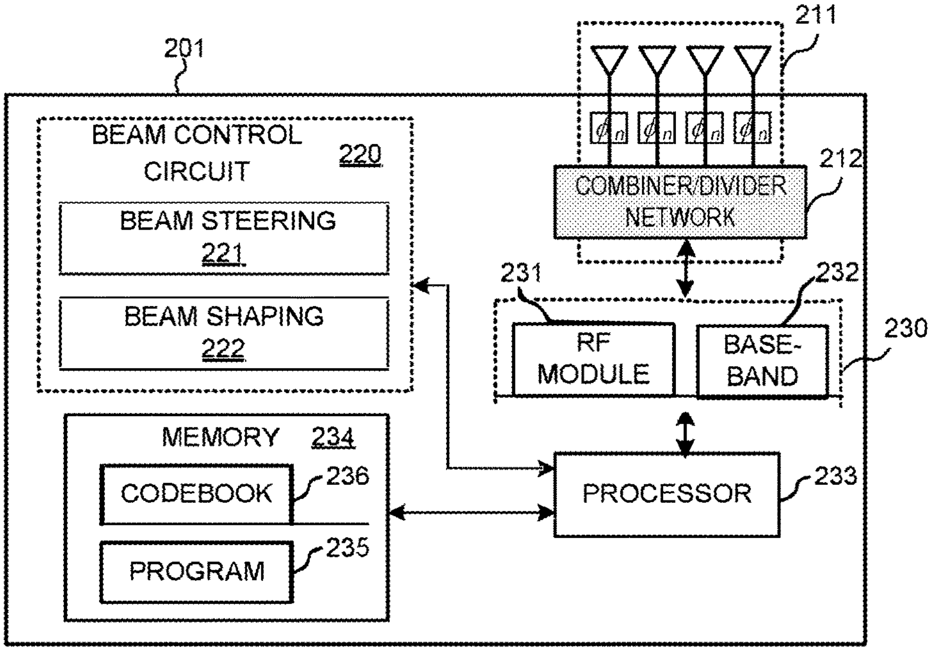
FIG. 2 is a simplified block diagram of a wireless transmitting device or a receiving device that carry out embodiments of the present invention.

FIG. 2 is a simplified block diagram of a wireless device 201 that carries out certain embodiments of the present invention. Device 201 has a phased-array antenna 211 having multiple antenna elements and a combiner and/or divider network 212 that transmits and receives radio signals, a transceiver 230 comprising one or more RF transceiver modules 231 and a baseband processing unit 232, coupled with the phased-array antenna, receives RF signals from antenna 211, converts them to baseband signal, and sends them to processor 233. RF transceiver 231 also converts received baseband signals from processor 233, converts them to RF signals, and sends out to antenna 211. Processor 233 processes the received baseband signals and invokes different functional modules and circuits to perform features in device 201. Memory 234 stores program instructions and data 235 and codebook 236 to control the operations of device 201. The program instructions and data 235, when executed by processor 233, enables device 201 to apply various beamforming weights to multiple antenna elements of antenna 211 and form various directional beams for communication.

Device 201 also includes multiple function modules and circuits that carry out different tasks in accordance with embodiments of the current invention. For example, device 201 comprises a beam control circuit 220, which further comprises a beam direction steering circuit 221 that steers the direction of the beam and a beamwidth shaping circuit 222 that shapes the beamwidth of the beam. Beam control circuit 220 may belong to part of the RF chain, which applies various beamforming weights to multiple antenna elements of antenna 211 and thereby forming various beams. Based on phased array reciprocity or channel reciprocity, the same receiving antenna pattern can be used for transmitting antenna pattern. In one example, beam control circuit 220 applies additional phase modulation to the original phase shift values that form a directional beam pattern with a desirable width. Beam steering circuit 221 applies the original phase shift values that form a directional narrow beam pattern. Beam shaping circuit 222 applies the additional phase modulation that expands the narrow beam pattern to a desirable width. Memory 234 stores a multi-antenna precoder codebook 236 based on the parameterized beamforming weights as generated from beam control circuit 220.

The functional modules and circuits can be implemented and configured by hardware, firmware, software, and any combination thereof. In one novel aspect, the phased-array antenna 211 including the combiner or divider network 212 having one or more single stage combiners supporting adjustable transmission line impedance and reasonable mismatch loss to reduce die size. The single stage combiner also has an adjustable isolation resistor for different power ratios. A structure of switchable branch characteristic impedance, switchable isolation resistor for the unequal combiner is proposed as the preferred embodiment. In one advantageous aspect, broader coverage angle in a single array module can be realized via an antenna diversity switch.

Figure 3:
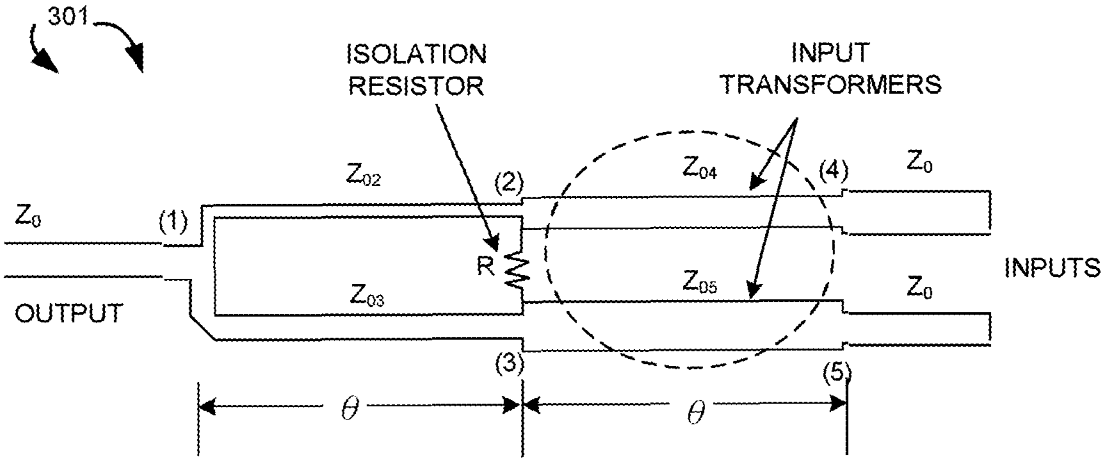
FIG. 3 illustrates one embodiment of an unequal power Wilkinson combiner and the design consideration of supporting different power ratios of an adjustable unequal single stage combiner to reduce overall size of the silicon in accordance with one novel aspect of the present invention.

FIG. 3 illustrates one embodiment of an unequal power Wilkinson combiner and the design consideration of supporting different power ratios of an adjustable unequal single stage combiner to reduce overall size of the silicon in accordance with one novel aspect of the present invention. The Wilkinson power combiner or divider is a well-known device in the RF or microwave community used for combining or splitting signals. It is composed of simple transmission lines and an isolation resistor, and takes advantage of the properties of quarter-wavelength transmission line sections to provide ideal power combiner or divider characteristics. The Wilkinson power combiner or divider provides isolation between the input or output terminals, is capable of being matched at all terminals and becomes lossless when the input or output terminals are matched. When the input terminals are mismatched, unequal power combiner needs to be designed. In order to achieve impedance match, a split-tree power combiner having two stages (2× quarter wavelength transmission lines) are typically considered. However, the two-stage unequal power combiner design makes the power combiners too large to implement in silicon.

In the example of FIG. 3, split-tree unequal power Wilkinson combiner 301 has two stages of combiners having four transmission lines with impedances $Z_{02}$ and $Z_{03}$ (the first stage of conventional combiner) and $Z_{04}$ and $Z_{05}$ (the second stage of input impedance transformers). An isolation resistor R is coupled to port 2 and port 3. The input and output terminals/ports have impedance $Z_0$. The power ratio between signal power at input port 4 and at input port 5 is K. According to the design equations for the unequal power Wilkinson combiner, table 310 illustrates the different impedance values and the isolation resistor values corresponding to different power ratio K, in order to achieve impedance matching and optimize signal to noise ratio (SNR) or amplitude tapering after combining. As depicted by 320, it is observed that if the power ratio P4/P5 is between plus or minus 3 dB, then the impedance values of the second stage $Z_{04}$ and $Z_{05}$ range from ~45 to ~56, which are very close to 50 ohm. This observation leads to an attempt of omitting the second stage of the combiner, as long as the mismatch loss is reasonable if the power ratio between input signals is less than ±6 dB.

Figure 4:
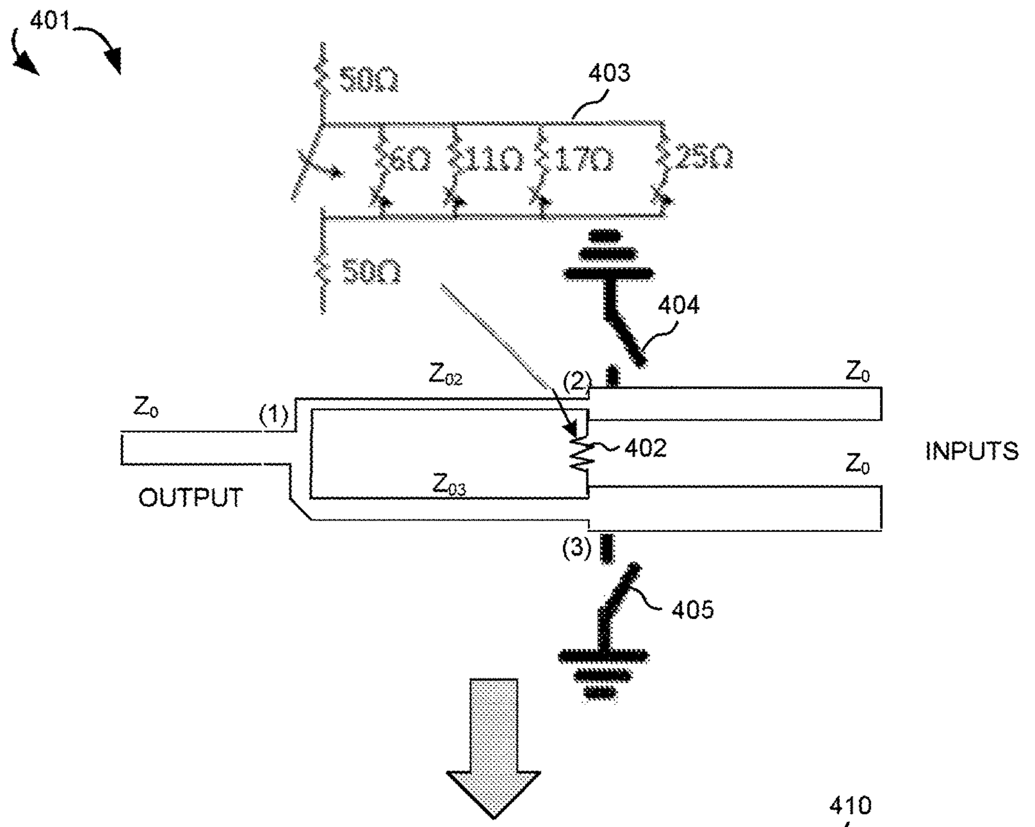
FIG. 4 illustrates one embodiment of a single stage unequal combiner 401 with adjustable transmission line impedance and isolation resistor supporting different input signal power ratios.

FIG. 4 illustrates one embodiment of a single stage unequal combiner 401 with adjustable transmission line impedance and isolation resistor supporting different input signal power ratios. The single stage combiner 401 has two input ports, one output port, each terminal has an impedance of $Z_0$. The two input ports are connected with each other via an isolation resistor 402. Each input port is connected to a quarter-wavelength transmission line having impedance of $Z_{02}$ and $Z_{03}$. As compared to the two-stage combiner 301 in FIG. 3, the single stage combiner 401 omits the second stage of transmission lines—the input impedance transformers with impedance $Z_{04}$ and $Z_{05}$ so that the die size of the unequal power combiner can be reduced. However, the transmission lines $Z_{02}$ and $Z_{03}$ need to have adjustable impedance according to the input signal power ratio K to optimize SNR.

Table 410 illustrates different power ratio K, different impedance values of $Z_{02}$ and $Z_{03}$, and different isolation resistor values, and corresponding mismatching losses due to the omission of the second stage impedance transformers $Z_{04}$ and $Z_{05}$. It can be seen that when the power ratio between the two input signals is limited to be less than ±6 dB, the mismatching loss due to not including the second stage $Z_{02}$ and $Z_{03}$ is within −15.34 dB, which is a reasonable mismatch loss. As a result, a preferred embodiment can be implemented for the single stage unequal power combiner.

In the preferred embodiment, when the power ratio between input signals is less than ±2 dB, then the isolation resistor 402 has a constant resistance value of 100 ohm. When the power ratio between input signals is between ±3 dB to ±6 dB, then the isolation resistor 402 has an adjustable resistance value that ranges from 106 ohm, 111 ohm, 117 ohm, and 125 ohm. In one novel aspect, the isolation resistor 402 can be implemented using a number of resistors and switches as depicted by 403. In this example, the five different resistance values can be achieved by different resistors controlled by five switches. In another novel aspect, when the power ratio is very big (e.g., K=0 or K=infinity), a switch configuration can be adopted. In equal/unequal combiner mode illustrated above, the two shunt switches 404 and 405 are in "open" state. In the switch configuration, one of the shunt switches is closed and the other one is open. The closed shunt switch shorts one end of transmission line to ground and the quarter wavelength transforms the impedance to "open". The quarter wavelength of the other transmission line is set to 50 ohm. The signal can pass through the other quarter wavelength transmission line.

The phased-array antenna and the combiner/divider network discussed above can be implemented as a semiconductor module on a silicon. The transmission lines, e.g., $Z_{02}$ and $Z_{03}$ of combiner 401, can be implemented using metal stripes to achieve the different adjustable characteristic impedances. As depicted by 420 in FIG. 4, the targeted unequal combining power ratio can have a limited range and be restricted to choices of ±2 dB, ±1 dB, 0 dB, and ±30 dB (on/off). As a result, the targeted transmission line characteristic impedances of the quarter wavelength transmission line for $Z_{02}$ and $Z_{03}$ are limited to choices of 50 ohm, 56.91 ohm, 63.23 ohm, 70.71 ohm, 79.6 ohm, and 90.2 ohm.

Figure 5:
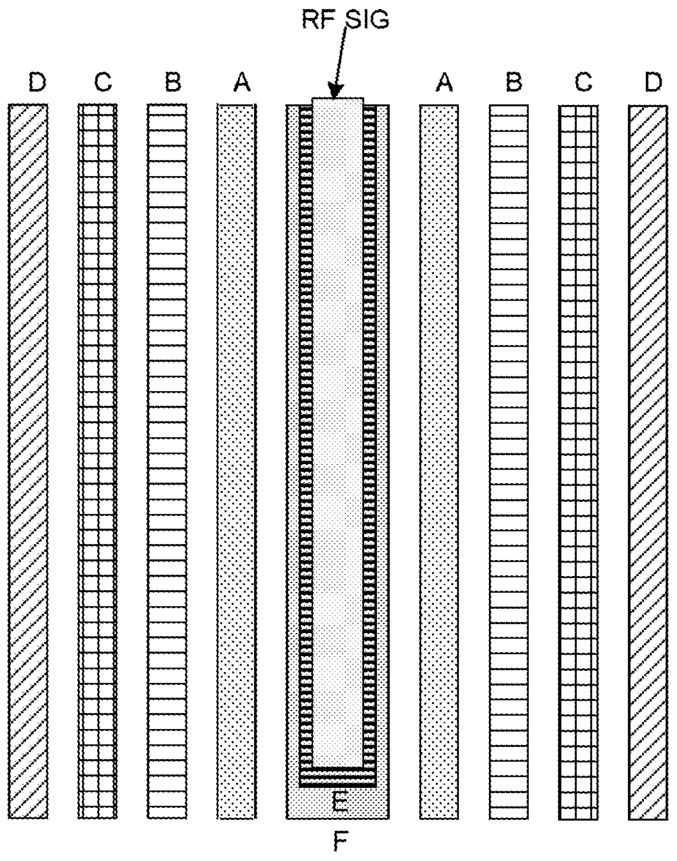
FIG. 5 illustrates one embodiment of transmission line implementation with different characteristic impedances for a single stage combiner.

FIG. 5 illustrates one embodiment of transmission line implementation with different characteristic impedances for a single stage unequal power combiner. As a general principle, for a short section of two-wire line, the transmission line characteristic impedance formula is approximated by $Z_0=\sqrt{L/C}$, where L is the unit length inductance, C is the unit length capacitance, and $Z_0$ is the characteristic impedance in ohms. Characteristic impedance depends on incremental parasitic L and parasitic C. Parasitic C is the capacitance between signal metal and ground metal. If two metals are closer, it results in higher C, and thus lower characteristics impedance.

In the embodiment of FIG. 5, a transmission line (TL) comprises many different metal strips A, B, C, D, E, and F, and the RF SIG line is in the middle for receiving input signal. The different metal strips form different branches of characteristic impedances by being open or grounded via the control of switches. In other words, different characteristic impedances are controlled by changing the grounding condition through the different metal strips. Depending on which metal strips are open or grounded (shorted to ground), the impedance of the transmission line changes. For example, metal strip D is farther away from the RF SIG, which results in lower parasitic C and higher characteristic impedance; on the other hand, Metal strip A is closer to the RF SIG, which results in higher parasitic C and lower characteristic impedance. Specifically, in order to realize the variable impedance of $Z_{02}$ and $Z_{03}$ as depicted in FIG. 4, the following can be implemented: 1) A is grounded, and the TL impedance is 50 ohm; 2) F and B are grounded, and the TL impedance is 56.91 ohm; 3) E and B are grounded, and the TL impedance is 63.23 ohm; 4) B is grounded, and the TL impedance is 70.71 ohm; 5) C is grounded, and the TL impedance is 79.6 ohm; and 6) D is grounded, and the TL impedance is 90.2 ohm.

Figure 6:
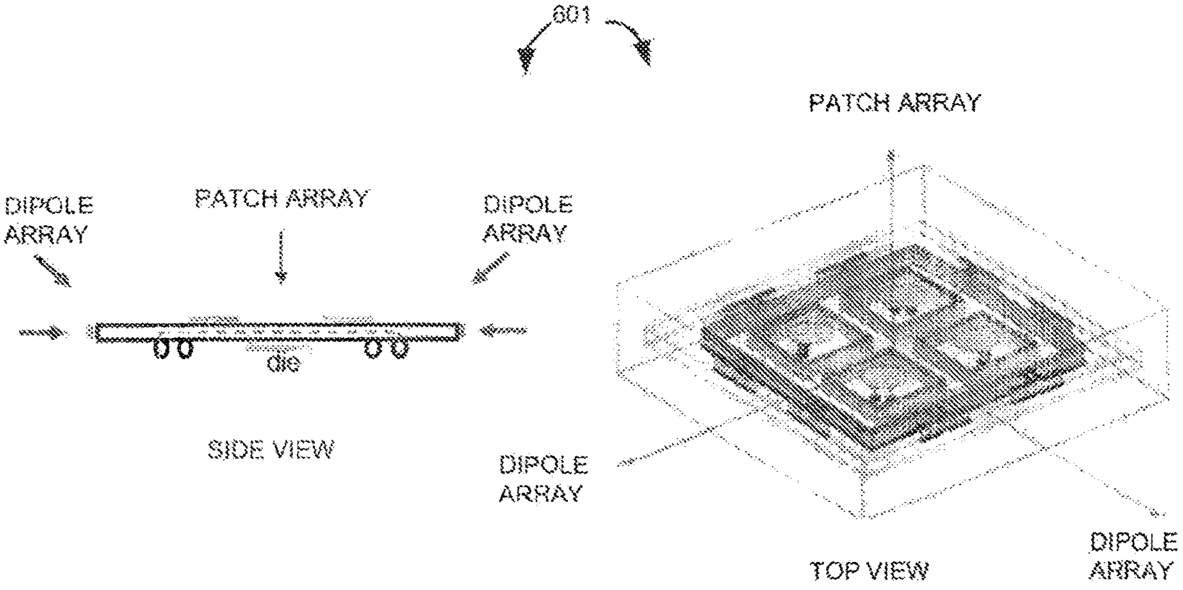
FIG. 6 illustrates a side view and a top view of multiple antenna arrays with an antenna diversity switch to increase the coverage angle and carry out embodiments of the present invention.

FIG. 6 illustrates a side view and a top view of an antenna array module 601 having multiple antenna arrays with antenna diversity switch to increase the coverage angle and carry out embodiments of the present invention. Multiple antenna arrays are placed in proximity to support multiple communication links such as in a base station. For example, the multiple array antennas can point to different user equipment directions to support multiple simultaneous communication links. However, the antenna sidelobe of one array antenna interferes with the mainlobe of another array antenna. To suppress the antenna sidelobe, amplitude tapering is applied where the signals of different antenna elements are weighted differently. To achieve such amplitude tapering, the variable amplifier and unequal combining are required to adjust the signal levels for different antennas.

In the example of FIG. 6, the antenna array module 601 comprises a Patch array on the top and four Dipole arrays on each side of the antenna module located on a silicon die. The Patch array can receive and transmit radio signals in vertical direction, while the Dipole arrays can receive and transmit radio signals in each of the four horizontal directions (e.g., east, south, west, and north). The different arrays Broad coverage angle in the antenna array module can be realized with antenna diversity switch. If the radio signal comes from the top, then the Patch array is switched to be active, and the Dipole arrays are switched to be inactive. If the radio signal comes from the side, then one of the Dipole arrays that can receive the signal is switched to be active, and the Patch array and other three Dipole arrays are switched to be inactive. As a result, the antenna array module is configured to switch between the multiple arrays to increase the coverage angle.

Figure 7:
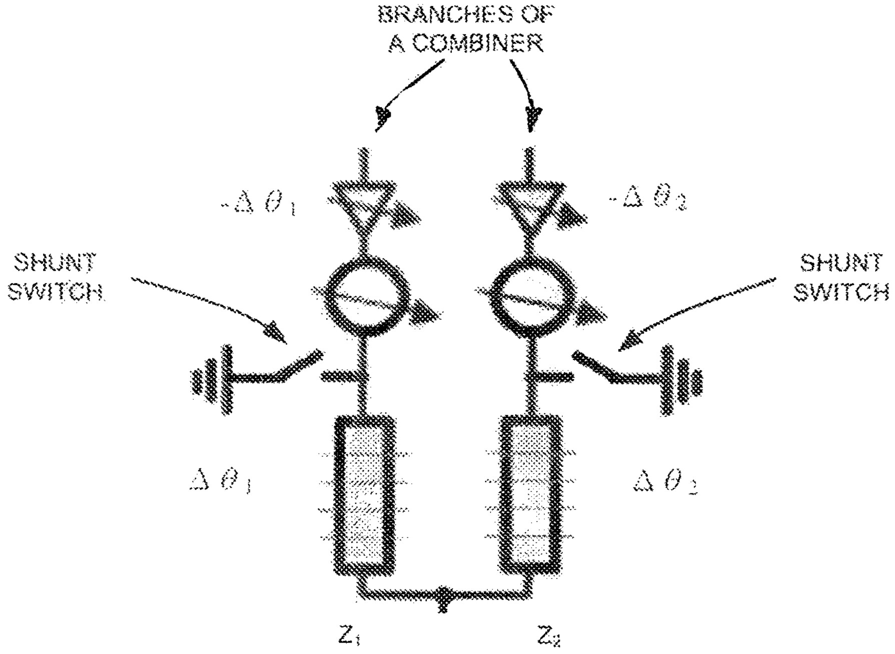
FIG. 7 illustrates one embodiment of an antenna diversity switch implementation in accordance with one novel aspect of the present invention.

FIG. 7 illustrates one embodiment of an antenna diversity switch implementation in accordance with one novel aspect of the present invention. A shunt to ground switch is added at the input terminal of the quarter wavelength impedance transformer to each of the branches of a combiner, each branch is connected to an antenna array of FIG. 6, and it can provide the single pole and double throw switch and act as an antenna diversity switch to increase the coverage angle of an antenna module. An RF short is created by closing one of the shunt switches at one of the input terminals, and the RF short becomes an RF open after the quarter wavelength impedance transformer. The isolation resistor that is coupled the two input terminals of the combiner is set to open and the other branch of the combiner is set to 50 ohm impedance. The 50 ohm impedance branch becomes the through path for the signal and the other branch is turned off.

Figure 8:
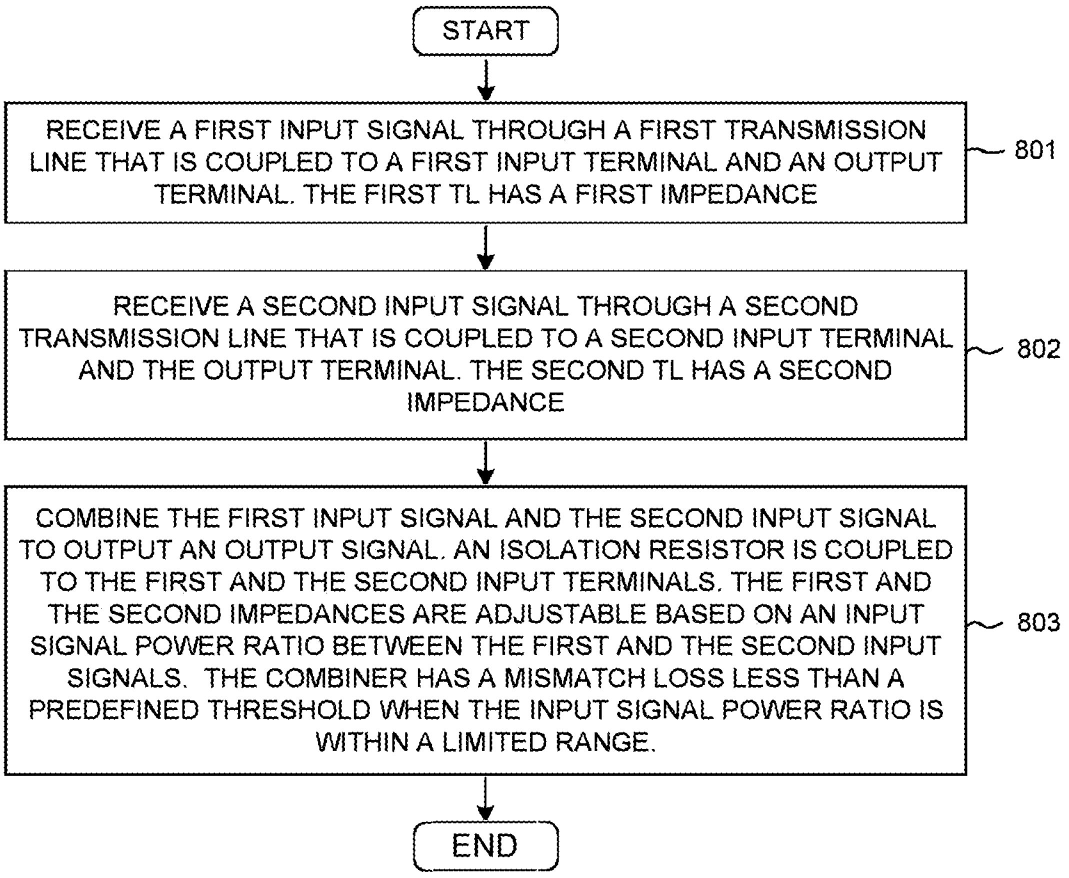
FIG. 8 is a flow chart of a method of implementing a single stage combiner in accordance with one novel aspect.

FIG. 8 is a flow chart of a method of implementing a single stage combiner in accordance with one novel aspect. In step 801, the combiner receives a first input signal through a first transmission line that is coupled to a first input terminal and an output terminal. The first transmission line has a first impedance. In step 802, the combiner receives a second input signal through a second transmission line that is coupled to a second input terminal and the output terminal. The second transmission line has a second impedance. In step 803, the combiner combines the first input signal and the second input signal to output an output signal. An isolation resistor is coupled to the first and the second input terminals. The first and the second impedances are adjustable based on an input signal power ratio between the first and the second input signals. The combiner has mismatch loss less than a predefined mismatch loss threshold when the input signal power ratio is within a limited range.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. An antenna module comprising:

a plurality of phased antenna arrays for receiving input signals, wherein each of the plurality of phased antenna arrays is positioned in proximity with different locations of the antenna module for receiving different input signals from different angles;

one or more unequal combiners, wherein each combiner has two input terminals coupled to the phased array antennas; and an antenna diversity switch coupled to each of the plurality of phased antenna arrays, wherein the antenna diversity switch controls one of the phased antenna arrays to be active at a time through the one or more unequal combiners, and wherein the antenna diversity switch comprises a shunt switch at each input terminal of a quarter impedance wavelength transformer of each combiner coupled to the phased antenna arrays.

2. The antenna module of claim 1, wherein the shunt switch is closed at one input terminal of a quarter impedance wavelength transformer of a combiner, and wherein an isolation resistor connecting the two input terminals of the combiner is open.

* * * * *